United States Patent
Negoro et al.

(10) Patent No.: US 10,179,625 B2
(45) Date of Patent: Jan. 15, 2019

(54) ELECTRICALLY ASSISTED BICYCLE

(71) Applicant: YAMAHA HATSUDOKI KABUSHIKI KAISHA, Iwata-shi, Shizuoka (JP)

(72) Inventors: Masanori Negoro, Shizuoka (JP); Kazuya Matsubara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 6 days.

(21) Appl. No.: 15/190,249

(22) Filed: Jun. 23, 2016

(65) Prior Publication Data

US 2016/0375955 A1  Dec. 29, 2016

(30) Foreign Application Priority Data

Jun. 26, 2015 (JP) .................. 2015-129105

(51) Int. Cl.
| | |
|---|---|
| *B62M 6/50* | (2010.01) |
| *B62M 6/40* | (2010.01) |
| *B62M 6/45* | (2010.01) |
| *B60L 11/00* | (2006.01) |

(Continued)

(52) U.S. Cl.
CPC .............. *B62M 6/50* (2013.01); *B60L 11/007* (2013.01); *B62M 1/36* (2013.01); *B62M 6/40* (2013.01); *B62M 6/45* (2013.01); *B62M 15/00* (2013.01)

(58) Field of Classification Search
CPC ........... B62M 6/50; B62M 1/36; B62M 15/00
See application file for complete search history.

(56) References Cited

U.S. PATENT DOCUMENTS

| | | |
|---|---|---|
| 5,603,388 A | 2/1997 | Yaguchi |
| 5,857,537 A | 1/1999 | Matsumoto et al. |

(Continued)

FOREIGN PATENT DOCUMENTS

| | | |
|---|---|---|
| EP | 0 729 881 A1 | 9/1996 |
| EP | 0 738 653 A2 | 10/1996 |

(Continued)

OTHER PUBLICATIONS

Official Communication issued in corresponding European Patent Application No. 16175649.9, dated Aug. 30, 2016.

*Primary Examiner* — Kimberly S Berona
*Assistant Examiner* — Michael F Whalen
(74) *Attorney, Agent, or Firm* — Keating and Bennett, LLP

(57) ABSTRACT

An electrically assisted bicycle includes a crank shaft, pedals, an electric motor, a pedal effort sensor that detects a pedal effort exerted on the pedals, a propelling detection sensor that detects that the electrically assisted bicycle is starting to be propelled, and a controller that executes a first control in which a command value provided to the electric motor is obtained based on the output of the pedal effort sensor and a second control in which a command value provided to the electric motor is obtained based on the output of the pedal effort sensor and the output of the propelling detection sensor. The controller is configured or programmed to select the first control or the second control as a calculation method of a command value provided to the electric motor during a period of time from a state in which the electrically assisted bicycle is stopped until a detection of the rotation of the crank shaft.

16 Claims, 4 Drawing Sheets

(51) Int. Cl.
*B62M 1/36* (2013.01)
*B62M 15/00* (2006.01)

(56) References Cited

U.S. PATENT DOCUMENTS

| | | | | |
|---|---|---|---|---|
| 6,131,683 A * | 10/2000 | Wada | ...................... | B62M 6/55 |
| | | | | 180/216 |
| 2005/0246152 A1 * | 11/2005 | Kokatsu | .................... | B62M 6/45 |
| | | | | 703/22 |
| 2012/0226400 A1 | 9/2012 | Hsu et al. | | |
| 2012/0265414 A1 * | 10/2012 | Cheng | .................... | B62M 9/123 |
| | | | | 701/55 |
| 2013/0138281 A1 | 5/2013 | Chien et al. | | |
| 2014/0081494 A1 * | 3/2014 | Chun | ...................... | B62M 6/45 |
| | | | | 701/22 |
| 2014/0166385 A1 * | 6/2014 | Arimune | ................... | B62M 6/45 |
| | | | | 180/206.3 |
| 2014/0166386 A1 * | 6/2014 | Arimune | ................... | B62M 6/45 |
| | | | | 180/206.3 |
| 2014/0336857 A1 * | 11/2014 | Chen | ........................ | B62M 6/45 |
| | | | | 701/22 |
| 2015/0291254 A1 * | 10/2015 | Lee | .......................... | B62M 6/50 |
| | | | | 180/206.3 |
| 2016/0167732 A1 * | 6/2016 | Modolo | ................... | B62M 6/50 |
| | | | | 701/22 |
| 2017/0151998 A1 * | 6/2017 | Negoro | .................... | B62J 6/001 |
| 2017/0320540 A1 * | 11/2017 | Baumgaertner | ......... | B62M 6/50 |
| 2018/0009503 A1 * | 1/2018 | Kinpara | ................... | B62M 6/45 |
| 2018/0072373 A1 * | 3/2018 | Kishita | ................... | B62M 6/45 |

FOREIGN PATENT DOCUMENTS

| | | | | | |
|---|---|---|---|---|---|
| EP | 1236640 | A2 | * | 9/2002 | ......... B60L 11/1803 |
| EP | 2505477 | A1 | * | 10/2012 | ............. B62M 6/45 |
| EP | 2826700 | A1 | * | 1/2015 | ............. B62M 6/45 |
| JP | 06211179 | A | * | 8/1994 | ............. B62M 6/50 |
| JP | 2001-122184 | A | | 5/2001 | |
| JP | 3655350 | B2 | | 6/2005 | |

* cited by examiner

ELECTRICALLY ASSISTED BICYCLE

BACKGROUND OF THE INVENTION

1. Field of the Invention

The present invention relates to an electrically assisted bicycle.

2. Description of the Related Art

Electrically assisted bicycles are known from Japanese Patent Unexamined Publication JP-A 2001-122184 and the like in which a motor torque is imparted to assist the pedal effort exerted by a rider. In the electrically assisted bicycle described in Japanese Patent Unexamined Publication JP-A 2001-122184, a plurality of response speeds are set at which an electric driving force is outputted in response to an application of a man-powered driving force, such that the riding comfort is enhanced by switching the response speeds by a switch or according to a mean value of the pedal effort.

Although electrically assisted bicycles are known in which the riding comfort is enhanced as in the electrically assisted bicycle described in Japanese Patent Unexamined Publication JP-A 2001-122184 above, wider output characteristics of an electric motor are desired depending upon situations or preferences of the rider.

SUMMARY OF THE INVENTION

Preferred embodiments of the present invention provide an electrically assisted bicycle including an electric motor including wider output characteristics.

According to a preferred embodiment of the present invention, an electrically assisted bicycle includes a crank shaft, pedals that rotate the crank shaft, an electric motor that assists a pedal effort exerted on the pedals by a rider, a pedal effort sensor that detect the pedal effort exerted on the pedals by the rider, a propelling detection sensor that detects a start of propelling of the electrically assisted bicycle, and a controller configured or programmed to execute a first control to obtain a command value provided to the electric motor based on an output of the pedal effort sensor and a second control to obtain a command value provided to the electric motor based on an output of the pedal effort sensor and an output of the propelling detection sensor, wherein the controller is configured or programmed to select the first control or the second control as a calculation method of a command value issued to the electric motor for a period of time from a state in which the electrically assisted bicycle is stopped until a detection of the rotation of the crank shaft.

The electrically assisted bicycle described above may further include an inclination sensor that detects an angle at which a bicycle body is inclined in a pitching direction, wherein the controller is configured or programmed to select the first control or the second control according to an output of the inclination sensor.

In the electrically assisted bicycle described above, in an event that the output of the inclination sensor exceeds a predetermined threshold, the controller is configured or programmed to select the first control.

In the electrically assisted bicycle described above, the propelling detection sensor detects a rotation of the crank shaft or a rotation of a wheel.

In the electrically assisted bicycle described above, the controller switches between the first control and the second control in response to a selector that is controlled by the rider.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
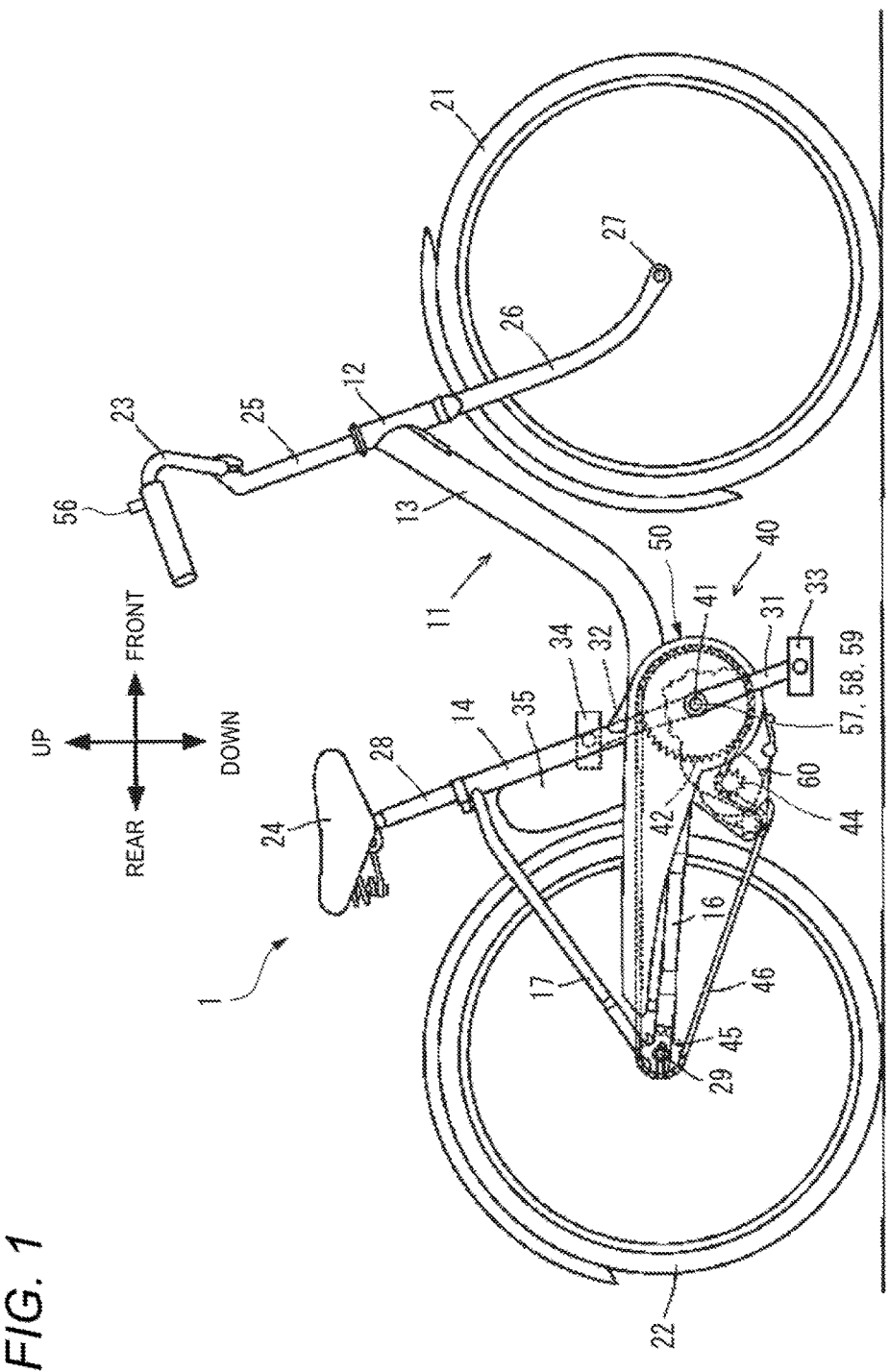
FIG. 1 is a right side view of an electrically assisted bicycle according to a preferred embodiment of the present invention.

Hereinafter, referring to the drawings, preferred embodiments of the present invention will be described. Dimensions of constituent elements in the drawings do not always represent true actual dimensions of the constituent elements and dimensional ratios of the constituent elements.

In the following description, front, rear, left, and right refer to front, rear, left, and right as viewed from a rider who is seated on a seat 24 of an electrically assisted bicycle 1 while gripping the handgrips of a handlebar 23.

FIG. 1 shows a schematic configuration of an electrically assisted bicycle 1 according to a preferred embodiment of the present invention.

The electrically assisted bicycle 1 is driven by a total drive torque including a pedal torque generated by a rider pressing pedals 33, 34 and a motor torque outputted from an electric motor 60. The motor torque of the electric motor is an assist torque which assists the rider to press the pedals 33, 34.

As shown in FIG. 1, the electrically assisted bicycle 1 includes a body frame 11 which extends in a front-to-rear direction. The electrically assisted bicycle 1 includes a front wheel 21, a rear wheel 22, a handlebar 23, a seat 24, and a power unit 40.

The body frame 11 includes a head tube 12, a down tube 13, a seat tube 14, a pair of chain stays 16, and a pair of seat stays 17. The head tube 12 is disposed at a front portion of the electrically assisted bicycle 1. A front portion of the down tube 13 which extends to the rear is connected to the head tube 12. The seat tube 14 is connected to a rear portion of the down tube 13 and extends obliquely upwards and rearwards from a rear end portion of the down tube 13.

A handlebar stem 25 is inserted into the head tube 12 so as to turn freely. The handlebar 23 is fixed to an upper end portion of the handlebar stem 25. A selector switch 56, which will be described below, is provided on the handlebar 23. A front fork 26 is fixed to a lower end portion of the handlebar stem 25. The front wheel 21 is supported rotatably at a lower end portion of the front fork 26 by an axle shaft 27.

A seat post 28 is inserted into the cylindrical seat tube 14. The seat 24 is provided at an upper end portion of the seat post 28.

The pair of chain stays 16 hold the rear wheel 22 from the left and right thereof. The pair of chain stays 16 extends from the rear of the down tube 13 towards a rotational center of the rear wheel 22. The pair of seat stays 17 extends from an upper portion of the seat tube 14 towards the rotational center of the rear wheel 22. The rear wheel 22 is supported rotatably at rear end portions of the chain stays 16 and the seat stays 17.

A battery 35 is disposed at the rear of the seat tube 14, and the battery 35 supplies electric power to an electric motor 60. The battery 35 includes a chargeable-dischargeable rechargeable battery and a battery controller, which are not shown. The battery controller controls the charging and discharging of the rechargeable battery and monitors an output current from the battery and a residual capacity or the state of charge of the battery.

The power unit 40 includes a crank shaft 41, a crank output shaft (not shown), a driving sprocket 42, a pedal torque detector 57, a crank displacement detector 58, the electric motor 60, and an auxiliary sprocket 44 which are incorporated in a unit case 50 as a unit. The power unit 40 preferably is fastened to the body frame 11 with bolts, for example.

The crank shaft 41 is rotatable and provided below the seat tube 14. The crank shaft 41 penetrates the unit case 50 in a left-to-right direction to be supported thereon. Crank arms 31, 32 are attached to both end portions of the crank shaft 41. The pedals 33, 34 are attached individually to distal ends of the crank arms 31, 32 to be rotatable. The pedal torque detector 57 detects a pedal torque which the rider inputs into the crank shaft 41 via the pedals 33, 34. The crank displacement detector 58 detects a displacement of the crank shaft 41 which is generated when the rider rotates the pedals 33, 34.

The driving sprocket 42 is attached to a right end of the cylindrical crank output shaft (not shown) which is coaxial with the crank shaft 41 via a one-way clutch. The driving sprocket 42 rotates together with the crank shaft 41. A driven sprocket 45 is coaxial with a drive shaft 29 of the rear wheel 22. The driven sprocket 45 is connected to the rear wheel 22 via a one-way clutch, not shown.

An endless chain 46 extends between the driving sprocket 42 and the driven sprocket 45 so as to wrap around them. Then, the driving sprocket 42 rotates when the rider presses the pedals 33, 34. Further, the rotation of the driving sprocket 42 is transmitted to the driven sprocket 45 by way of the chain 46 to drive the rear wheel 22.

The electric motor 60 is disposed at the rear of the crank shaft 41 within the unit case 50. The auxiliary sprocket 44 is provided on an output shaft of the electric motor 60. Electric power is supplied to the electric motor 60 from the battery 35. Supplying electric power to the electric motor 60 starts the electric motor 60 to rotate. The rotation of the electric motor 60 is transmitted to the chain 46 by way of the auxiliary sprocket 44. In this way, when electric power is supplied to the electric motor 60, an assisting torque is produced in the electric motor 60. This assisting toque is transmitted to the rear wheel 22 by way of the chain 46.

Figure 2:
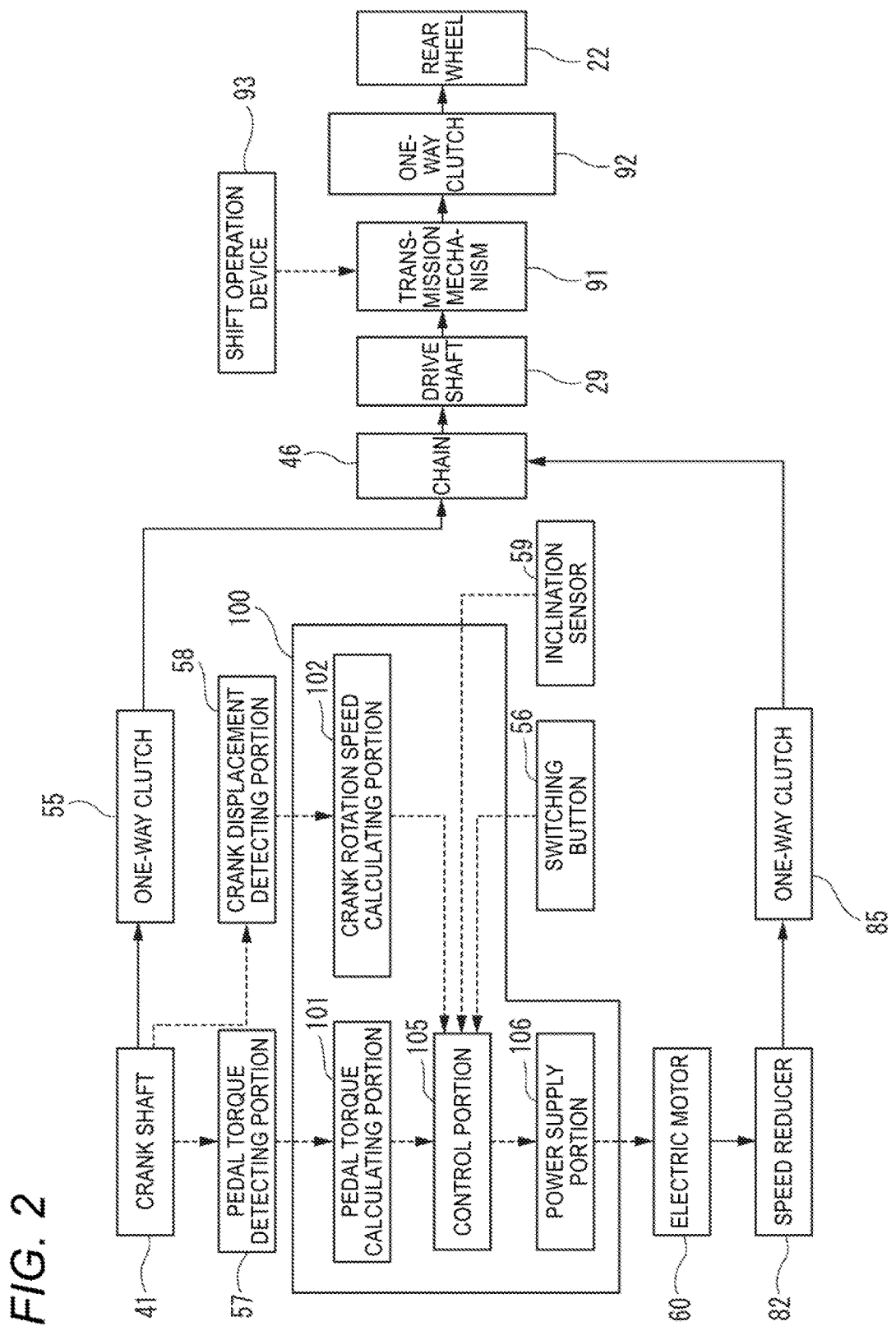
FIG. 2 is a block diagram of the electrically assisted bicycle shown in FIG. 1.

In the electrically assisted bicycle 1 described above, the electric motor 60 is controlled by a controller 100 to apply a driving torque, which is a combination of the pedal torque and the assisting torque, to the wheel. FIG. 2 is a block diagram showing transmission of power and transmission and reception of signals in the electrically assisted bicycle 1 according to a preferred embodiment of the present invention.

As shown in FIG. 2, the controller 100 includes a pedal torque calculator 101 (an example of a pedal effort sensor), a crank rotation speed calculator 102 (an example of a propelling detection sensor), a controller 105 and an electric power supply 106. The electrically assisted bicycle 1 includes the selector switch 56, the pedal torque detector 57, the crank displacement detector 58, and an inclination sensor 59 that detects an angle at which the bicycle body is inclined in a pitching direction.

Next, a power transmission line will be described.

When the rider presses the pedals 33, 34 to rotate the crank shaft 41, the rotation of the crank shaft 41 is transmitted to the chain 46 by way of the one-way clutch 55. The one-way clutch 55 transmits a forward rotation of the crank shaft 41 to the chain 46 and does not transmit a reverse rotation of the crank shaft 41 to the chain 46.

The rotation of the chain 46 is transmitted to the drive shaft 29 of the rear wheel 22. The rotation of the drive shaft 29 is transmitted to the rear wheel 22 by way of a transmission mechanism 91 and a one-way clutch 92.

The transmission mechanism 91 is able to change speed gears in response to the operation of a change-speed controller, or shift device 93.

The one-way clutch 92 transmits the rotation of the drive shaft 29 to the rear wheel 22 only when the rotation speed of the drive shaft 29 is faster than the rotation speed of the rear wheel 22. When the rotation speed of the drive shaft 29 is slower than the rotation speed of the rear wheel 22, the one-way clutch 92 does not transmit the rotation of the drive shaft 29 to the rear wheel 22.

The rotation of the electric motor 60 is transmitted to a one-way clutch 85 via a speed reducer 82. The one-way clutch 85 transmits only the rotation of the electric motor 60 in a direction in which the speed reducer 82 rotates the chain 46 forwards to the chain 46 but does not transmit the rotation of the electric motor 60 in a direction in which the seed reducer 82 rotates the chain 46 reversely.

In this way, in the electrically assisted bicycle 1 according to the present preferred embodiment, the pedal torque inputted into the crank shaft 41 and the assisting torque of the electric motor 60 are combined together at the chain 46.

Next, a signal line will be described.

When the rider exerts a pedal effort on the pedals 33, 34 to rotate the crank shaft 41, the pedal torque is then applied to the crank shaft 41. The pedal torque detector 57 provided on the bicycle generates a signal according to the pedal torque inputted into the crank shaft 41. The pedal torque detector 57 inputs the signal into the pedal torque calculator 101.

The pedal torque calculator 101 converts the signal from the pedal torque detector 57 into a pedal torque exerted on the pedals 33, 34 by the rider. The pedal torque calculator 101 inputs the pedal torque value into the controller 105. The pedal torque value varies periodically. Specifically, the pedal torque takes a lowest value when the pedals 33, 34 come to a top dead point or a bottom dead point and takes a greatest value when the pedals 33, 34 are located between the top dead point and the bottom dead point. One cycle of the pedal torque corresponds to a half rotation of the crank shaft 41.

The crank displacement detector 58 is a sensor that detects the phase of the crank shaft 41 which changes according to the rotation of the crank shaft 41. In the present preferred embodiment, the crank displacement detector 58 outputs one ON signal as the crank shaft 41 rotates one full rotation. The crank displacement detector 58 inputs the signal into the crank rotation speed calculator 102.

The crank rotation speed calculator 102 time differentiates the phase information of the crank shaft 41 inputted from the crank displacement detector 58 and converts the signal from the crank displacement detector 58 into the crank rotation speed provided to the pedals 33, 34 by the rider. The crank rotation speed calculator 102 inputs the crank rotation speed into the controller 105.

The inclination sensor 59 detects an angle in the pitching direction. Namely, the inclination sensor 59 detects an inclined angle of the bicycle in a front-to-rear direction with respect to a horizontal direction. For example, the inclination sensor 59 outputs a signal that signals a positive angle when the bicycle is situated on a slope with an upward gradient and outputs a signal that signals a negative angle when the bicycle is situated on a slope with a downward gradient.

Outputs of the pedal torque calculator 101, the crank rotation speed calculator 102, the inclination sensor 59, and the selector switch 56 are inputted into the controller 105. The controller 105 calculates a command value based on the outputs of the pedal torque calculator 101, the crank rotation speed calculator 102, the inclination sensor 59, and the selector switch 56. The electric power supply 106 supplies electric power according to the command value provided to the electric motor 60 from the battery 35. Namely, the controller 105 causes the electric power supply 106 to generate electric power to be supplied to the electric motor 60. The electric power supply 106 supplies electric power to the electric motor 60 causing the electric motor 60 to generate an assisting torque.

The controller 105 is configured or programmed to execute a first control and a second control which differ from each other. The first control obtains a command value provided to the electric motor 60 based on the output of the pedal torque calculator 101. The second control obtains a command value provided to the electric motor 60 based on the output of the pedal torque calculator 101 and the output of the crank rotation speed calculator 102. The controller 105 is configured or programmed to select the first control or the second control as a calculation method of a command value provided to the electric motor 60 during a period of time from a state in which the electrically assisted bicycle 1 is stopped until a detection of the rotation of the crank shaft 41.

The first control and the second control will be described in detail with reference to FIGS. 3A and 3B.

Figure 3A:
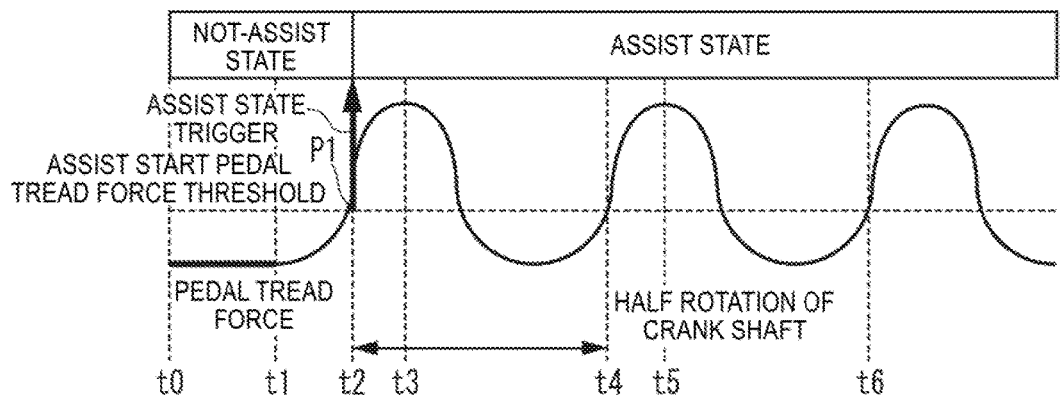
FIGS. 3A and 3B are timing charts of a pedal effort when the electrically assisted bicycle is started.
Figure 3B:
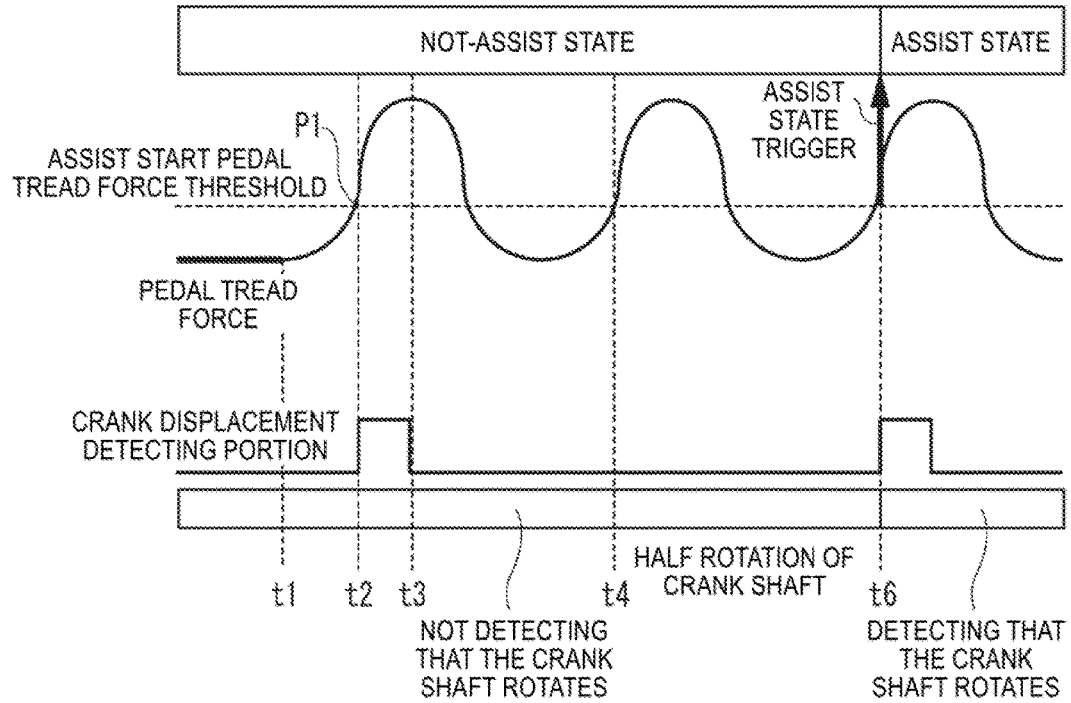

FIGS. 3A and 3B are timing charts of pedal effort and an assisting state when the electrically assisted bicycle 1 is starting to be propelled. In the following description, a state in which the electric motor 60 is generating an assisting torque will be referred to as an assisting state, and a state in which the electric motor 60 is not generating an assisting torque will be referred to as a non-assisting state.

In FIGS. 3A and 3B, no pedal effort is inputted to the pedals 33, 34 in an initial state (a time t0). The rider exerts a pedal effort on the pedals 33, 34 at a time t1, and a predetermined magnitude of pedal effort P1 is exerted on the right pedal 33 at a time t2. As shown in FIG. 3B, in the present preferred embodiment, the crank displacement detector 58 outputs an ON signal when the crank shaft 41 shifts into a phase where the predetermined magnitude of the pedal effort P1 is exerted on the right pedal 33.

Further, a greatest pedal effort is exerted on the right pedal 33 at a time t3. Furthermore, the rider rotates the pedals 33, 34, and the predetermined magnitude of the pedal effort P1 is exerted on the left pedal 34 at a time t4. Then, the rider rotates the pedals 33, 34 further, and the greatest pedal effort is exerted on the left pedal 34 at a time t5.

The rider rotates the pedals 33, 34 furthermore, the predetermined magnitude of the pedal effort P1 is exerted on the right pedal 33 at a time t6. At this time, the crank displacement detector 58 outputs an ON signal for the second time because the crank shaft 41 shifts again into the phase where the predetermined magnitude of pedal effort P1 is exerted on the right pedal 33.

For example, the crank shaft 41 rotates a half of one full rotation during a time from the time t2 to the time t4. In the illustrated example, the crank shaft 41 rotates half of one full rotation from the state in which the electrically assisted bicycle 1 is stopped by the time t4, at the latest.

The crank rotation speed calculator 102 determines that the crank shaft 41 rotates one full rotation when the crank displacement detector 58 outputs an ON signal for the second time (the time t6) after it has outputted the ON signal for the first time. Namely, the controller 105 does not detect the rotation of the crank shaft 41 from a time t0 until a time just before the time t6 and detects the rotation of the crank shaft 41 at the time t6.

In the present preferred embodiment, the crank rotation speed calculator 102 estimates the rotation speed of the crank shaft 41 based on a time interval (t6 to t2) between the first ON signal and the second ON signal. The crank rotation speed calculator 102 cannot estimate the rotation speed of the crank shaft 41 at a point in time (the time t2) when the crank displacement detector 58 outputs the first ON signal from the state in which the bicycle is stopped. Because of this, it is not until the time t6 that the crank rotation speed calculator 102 calculates a rotation speed of the crank shaft 41.

FIG. 3A shows a timing chart when the controller 105 executes the first control. In the first control, a command value is calculated based on the pedal effort transmitted from the pedal torque calculator 101. For example, in the first control, a command value is calculated which is in direct proportion to the pedal effort.

As shown in FIG. 3A, when the pedal effort becomes equal to or greater than the predetermined value P1 at the time t2, a command value is generated. This causes the electric motor 60 to generate an assisting torque. Namely, according to the first control, an assisting state is produced from the time t2. According to the first control, when the rider presses the pedals 33, 34, the assisting torque is generated at once in the electric motor 60.

FIG. 3B shows a timing chart when the controller 105 executes the second control. In the second control, a command value is calculated based on the pedal effort transmitted from the pedal torque calculator 101 and the crank rotation speed transmitted from the crank rotation speed calculator 102.

As has been described above, the crank rotation speed calculator 102 estimates the rotation speed of the crank shaft 41 when the crank displacement detector 58 outputs the ON signal for the second time (the time t6). Because of this, the controller 105, when executing the second control, cannot calculate a command value until the time t6 when the crank displacement detector 58 outputs the ON signal for the second time. Namely, according to the second control, an assisting state is produced from the time t6.

In this way, according to the second control, the assisting torque is outputted after the predetermined length of time has elapsed (at the time t6) since the time (t1) when the rider presses the pedals 33, 34. Because of this, the controller 105, when executing the second control, cannot output the assisting torque immediately after the rider presses the pedals 33, 34.

Even though the rotation of the crank shaft 41 is detected by detecting the first and second ON signals even when the crank shaft 41 rotates through a small rotation angle by enhancing the resolution capability of the crank displacement detector 58, the time interval (t6 to t2) between the first and second ON signals does not become zero, and hence, a predetermined length of time needs to elapse until the assisting torque is generated by executing the second control. Consequently, it remains true that the assisting torque cannot be outputted immediately after the rider presses the pedals 33, 34. For example, even though the crank displacement detector 58 outputs an ON signal every time the crank shaft 41 rotates half of one full rotation, the time interval between a first and second ON signals is finite. Therefore, a predetermined length of time needs to elapse until the assisting torque is generated by executing the second control.

In this way, the first control is superior to the second control in that the assisting torque is generated in the electric motor 60 at an earlier stage. On the other hand, from the viewpoint of the smoothness of the assisting torque, a smoother assisting torque is generated by the second control than by the first control.

For example, since the pedal effort changes minutely as the time goes by as shown in FIGS. 3A and 3B, in case a command value is calculated based only on the pedal effort as in the first control, the command value also changes minutely, and this causes the assisting torque to change accordingly every time the rider presses the pedals 33, 34.

In contrast to this, according to the second control, since a command value is calculated based on the pedal effort and the crank rotation speed, a command value is calculated so that a constant or substantially constant assisting torque is outputted by, for example, smoothing the change in pedal effort based on the crank rotation speed.

In this way, the ride specific to the first and second controls is achieved by the first control and the second control. In the present preferred embodiment, the controller is configured or programmed to select the first control or the second control when calculating the command value for the period of time (from the time t0 to the time t6) from the state in which the electrically assisted bicycle 1 is stopped until the detection of the rotation of the crank shaft 41.

According to the electrically assisted bicycle 1 of the present preferred embodiment, since the first control and the second control are selected which refer to different parameters when calculating a command value, the electrically assisted bicycle 1 is provided which has wide output characteristics.

In addition, according to the electrically assisted bicycle 1 of the present preferred embodiment, it is possible to select the first control or the second control when the bicycle is starting to be propelled where the rotation of the crank shaft 41 is detected from the state in which the bicycle is stopped. According to the first control, the assisting torque is obtained from the point in time when the pedals 33, 34 are pressed. According to the second control, the assisting torque is obtained after the predetermined length of time elapses since the pedals 33, 34 are pressed by the rider.

The inventor of the present invention has discovered that the user tends to easily feel the difference of the sensation of assistance produced by the different command value calculation methods when the bicycle is starting to be propelled. The inventor has discovered that the user feels a noticeable difference in the assisting force by enabling the selection of the first control or the second control in particular when the electrically assisted bicycle 1 is started from rest, which is effective in expanding the output characteristics of the electrically assisted bicycle 1. According to the electrically assisted bicycle 1 of the present preferred embodiment, the first control and the second control are selected so that the user easily feels the difference in sensation of assistance produced by the different command value calculation methods. Because of this, it is possible to provide the electrically assisted bicycle 1 which allows the rider to feel the sensation of assistance which is suitable for the rider or the situation.

The command value calculation method of Japanese Patent Unexamined Publication JP-A 2001-122184 in which the command value is calculated based on the pedal effort only switches the response speeds of the assisting torque. Namely, the target parameter which is referred to in calculating a command value does not change, and therefore, even though the response speed is changed, the output characteristics do not change greatly. Because of this, in the electrically assisted bicycle of Japanese Patent Unexamined Publication JP-A 2001-122184, only the superficial feature of the ride quality is changed, and hence, in this electrically assisted bicycle, contrary to the preferred embodiments of the present invention, the timing at which the assisting torque is outputted is not changed, and the way in which the assisting torque varies is not changed such that the ride quality is never changed drastically. In the electrically assisted bicycle of Japanese Patent Unexamined Publication JP-A 2001-122184, the response speed of the assisting torque is not switched when the bicycle is starting to be propelled where the rider tends to feel easily the difference in sensation of the assistance produced by the different command value calculation methods.

Figure 4:
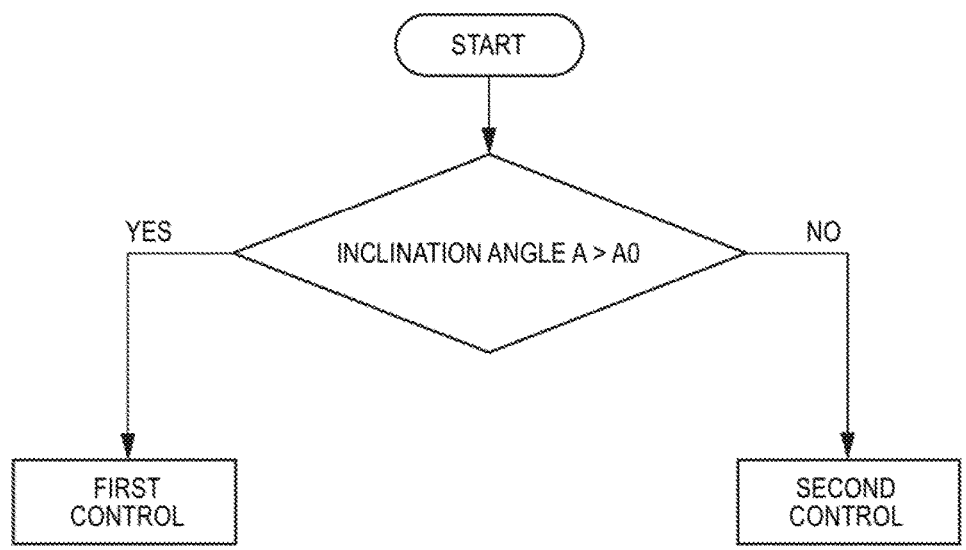
FIG. 4 is a flowchart showing selection of a first control and a second control.

In the present preferred embodiment, the controller 105 is configured or programmed to select automatically the first control or the second control based on the inclination angle of the bicycle body in the pitching direction. FIG. 4 is a flowchart illustrating the flow of operations executed by the controller 105 in determining the selection of the first control or the second control.

As shown in FIG. 4, the controller 105 receives an output of the inclination sensor 59 that detects an inclined angle A of the bicycle body in the pitching direction. The controller 105 determines whether or not the inclined angle A of the bicycle body is greater than a predetermined value A0. If the inclined angle A of the bicycle body is greater than the predetermined value A0 (Step 1: Yes), the controller 105 executes the first control. If the inclined angle A of the bicycle body is smaller than the predetermined value A0 (Step 1: No), the controller 105 executes the second control.

By using this configuration, even when the electrically assisted bicycle 1 starts on a steep upward slope and the inclined angle A of the bicycle body is great, the first control is executed in which the assisting torque is outputted immediately after the rider presses the pedals 33, 34. Because of this, when the electrically assisted bicycle 1 starts on the steep upward slope where the assisting torque is required immediately, since the assisting torque is obtained immediately when the rider presses the pedals 33, 34, the labor of the rider is reduced.

On the other hand, when the electrically assisted bicycle 1 starts on a flat road surface or a slope with a downward gradient, the second control is executed to obtain an assisting torque with less change when the bicycle 1 starts from rest on the slope. Therefore, the rider enjoys feeling a comfortable ride quality when the bicycle 1 starts from rest.

In the present preferred embodiment, the controller 105 is described as switching between the first control and the second control automatically based on the output of the inclination sensor 59. However, the present invention is not limited to this. The first control and the second control may be switched by a selector switch provided on the bicycle that is controlled by the rider.

For example, the selector switch 56 may be an alternating switch such that when the switch is switched to one side, the controller 105 is caused to execute the first control, and when the switch is switched to another side, the controller 105 is caused to execute the second control.

Alternatively, the selector switch 56 may be a push switch in which the first control and the second control are switched each time the switch is depressed.

Figure 5:
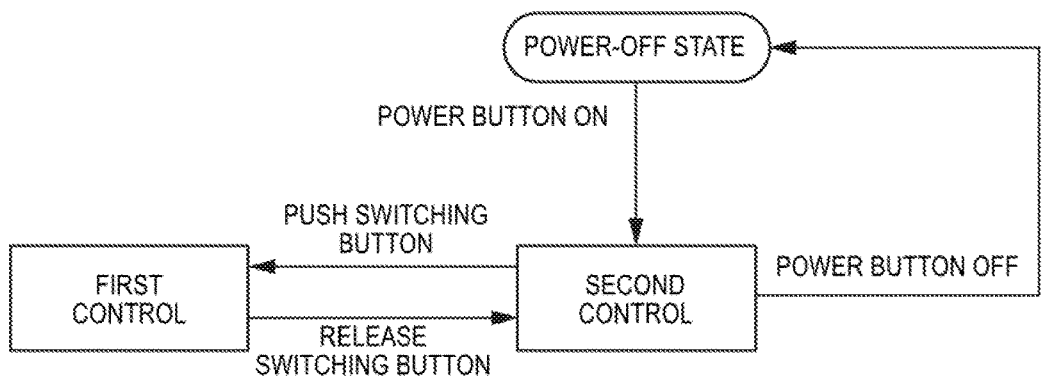
FIG. 5 is a diagram illustrating a transition of states in response to depression of a selector switch.

Alternatively, as shown in FIG. 5, the selector switch may be a momentary switch, in which the controller 105 is caused to execute the first control while the switch is kept depressed, and the controller 105 is caused to execute the second control while the switch is kept released.

In the present preferred embodiment, the crank rotation speed calculator that detects the rotation speed of the crank shaft is described as corresponding to the propelling detection sensor that detects that the electrically assisted bicycle 1 is starting to be propelled. However, the present invention is not limited to this. For example, a wheel speed detector that detects the rotation of the front wheel or the rear wheel may be used as the propelling detection sensor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically assisted bicycle comprising:
   a crank shaft;
   pedals that rotate the crank shaft;
   an electric motor that assists a pedal effort exerted on the pedals by a rider;
   a pedal effort sensor that detects a torque exerted on the pedals by the rider;
   a propelling detection sensor that detects a start of propelling of the electrically assisted bicycle; and
   a controller configured or programmed to select and execute a first control and a second control, the first control calculating a command value provided to the electric motor based on an output of the pedal effort sensor but not an output of the propelling detection sensor, and the second control calculating a command value provided to the electric motor based on an output of the pedal effort sensor and an output of the propelling detection sensor; wherein
   the controller selects the first control or the second control as a calculation method of a command value issued to the electric motor for a period of time from a state in which the electrically assisted bicycle is stopped until a detection of the rotation of the crank shaft.

2. The electrically assisted bicycle according to claim 1, further comprising:
   an inclination sensor that detects an angle at which a bicycle body is inclined in a pitching direction; wherein
   the controller selects the first control or the second control according to an output of the inclination sensor.

3. The electrically assisted bicycle according to claim 2, wherein, when the output of the inclination sensor exceeds a predetermined threshold, the controller selects the first control.

4. The electrically assisted bicycle according to claim 1, wherein the propelling detection sensor detects a rotation of the crank shaft or a rotation of a wheel.

5. The electrically assisted bicycle according to claim 1, wherein the controller switches between the first control and the second control in response to a selector controlled by the rider.

6. The electrically assisted bicycle according to claim 1, wherein the first control and the second control are different.

7. The electrically assisted bicycle according to claim 1, wherein the first control and the second control are based on different parameters.

8. The electrically assisted bicycle according to claim 1, wherein the first control calculates the command value based only on the output of the pedal effort sensor.

9. A method for controlling an electrically assisted bicycle that has a crank shaft, pedals for rotating the crank shaft, an electric motor which is adapted to assist pedal effort exerted on the pedals by a rider, a pedal effort sensor which is adapted to detect a torque exerted on the pedals by the rider, and a propelling detection sensor which is adapted to detect a start of propelling of the electrically assisted bicycle, the method comprising:
   providing the electrically assisted bicycle with a first control and a second control as a calculation method of a command value issued to the electric motor for a period of time from a state where the electrically assisted bicycle is stopped until a detection of a rotation of the crank shaft;
   selecting one of the first control and the second control;
   when the first control is selected, calculating a command value based on an output of the pedal effort sensor but not an output of the propelling detection sensor; and
   when the second control is selected, calculating a command value based on an output of the pedal effort sensor and an output of the propelling detection sensor.

10. The method according to claim 9, wherein
   the first control or the second control is selected according to an output of the inclination sensor which detects an angle at which a bicycle body is inclined in a pitching direction.

11. The method according to claim 10, wherein
   the first control is selected in the event that the output of the inclination sensor exceeds a predetermined threshold.

12. The method according to claim 9, wherein
   a rotation of the crank shaft or a rotation of a wheel is detected by the propelling detection sensor.

13. The method according to claim 9, wherein
   the rider controls a selector that is provided on the bicycle and that switches between the first control and the second control.

14. The method according to claim 9, wherein the first control and the second control are different.

15. The method according to claim 9, wherein the first control and the second control are based on different parameters.

16. The method according to claim 9, wherein the first control calculates the command value based only on the output of the pedal effort sensor.

* * * * *